2,843,565
BUTENYL PHENOL-ALDEHYDE RESINS

Roger M. Christenson, Whitefish Bay, and Lowell O. Cummings and Alfred R. Bader, Milwaukee, Wis., assignors to Pittsburgh Plate Glass Company No Drawing. Application November 3, 1953
Serial No. 390,088

4 Claims. (Cl. 260—53)

This invention relates to the preparation of novel and useful phenol-aldehyde type resins, and pertains more particularly to the preparation of such resins by the acidic condensation of an aldehyde with a mixture of alkenylphenols.

In a copending application, Serial No. 390,089, filed November 3, 1953, it is disclosed that mixtures of alkenylphenols, ordinarily containing monoalkenylphenols, dialkenylphenols, and trialkenylphenols, condense readily with aldehydes in the presence of an alkaline catalyst to form resins which produce films that are fast drying and curing and very light colored. The resins prepared by the method of the copending application are extremely compatible with materials utilized in the preparation of coating compositions such as epoxide resins, alkyd resins, vinyl resins and polyvinyl acetal resins. In this respect they are superior to other known phenolic resins which tend to be incompatible with many of the materials listed above.

It has now been discovered that mixtures of alkenylphenols condense with aldehydes such as formaldehyde in the presence of acidic catalysts to produce resins which are generally hard, grindable materials that are very useful in preparation of varnishes and as molding resins. Liquid resins useful in the preparation of varnishes may also be obtained by this method.

In the acidic condensation of alkenylphenols with formaldehyde, the intermediately formed methylol groups tend to react with additional quantities of the phenolic compound, and as a result of this further reaction, the resinous condensation product contains a large number of methylene linkages. In the base catalyzed condensation, on the other hand, the methylol groups do not react readily with more of the phenolic compound and the resulting condensation product contains many methylol groups and relatively few methylene linkages.

This substantial difference in the manner in which the condensations proceed is believed to account at least in part for the fact that the acid catalyzed products are generally hard resins, useful as molding resins and as varnish resins (particularly when the aldehyde to phenol ratio is low), whereas the base catalyzed products are generally viscous liquids which are useful in themselves, or when plasticized, as excellent film forming materials.

The mixture of alkenylphenols which is condensed with an aldehyde in accordance with the present invention may vary widely in composition. Ordinarily, the predominant component of the mixture is one or more monoalkenylphenols, (including ortho- and para-monoalkenylphenols), the monoalkenyl component constituting about 55 to 85 percent by weight of the total mixture. The balance of the mixture (15 to 45 percent) is composed primarily of di- and trialkenylphenols, although other phenolic materials, including polyphenols such as alkane di- and triphenols may also be present, depending upon the method by which the alkenylphenol mixture is prepared.

Mixtures of alkenylphenols of the type described in the foregoing paragraph are readily obtained by the methods described in copending applications, Serial No. 300,359, filed July 22, 1952, and Serial Nos. 337,226, 337,227, 337,228 and 337,229, all filed February 16, 1953. The methods described in these copending applications involve the reaction of conjugated dienes with phenolic compounds in the presence of certain catalysts such as the Friedel-Crafts compounds. For example, the reaction product obtained by the reaction of butadiene-1,3 with phenol in the presence of an aqueous sulfuric acid catalyst is generally composed of less than about 15 percent unreacted phenol, less than about 5 percent of ethers, 55 to 70 percent of monobutenylphenols and 15 to 50 percent of the higher boiling phenols including di- and tributenylphenols and polyphenols. Ordinarily, the unreacted phenol and ethers will be removed from the reaction mixture by distillation before the condensation reaction with an aldehyde is carried out; however, this is not a critical expedient and the condensation reaction takes place readily even though the unreacted phenols and ethers are not removed. Mixtures containing smaller quantities of monoalkenylphenols and larger quantities of the higher boiling phenols, for example, about 50 percent monoalkenylphenols and 30 to 50 percent of higher boiling phenols and the balance polyphenols and ethers, may also be employed with good results, as may mixtures containing no monoalkenylphenols. Also, the mixture may be composed entirely of ortho- and para-monoalkenylphenols.

It is to be understood that mixtures of some alkenylphenols may also be obtained by other methods known to the art in addition to the reaction of conjugated dienes with phenolic compounds, and it is intended that the present invention include the use of any mixture of alkenylphenols regardless of the method whereby it is obtained.

As illustrative of the alkenyl substituted phenolic compounds which in admixture are condensed with an aldehyde to form the novel resins of the present invention there are set forth below the products of the aqueous sulfuric acid catalyzed reaction of butadiene-1,3 and phenol:

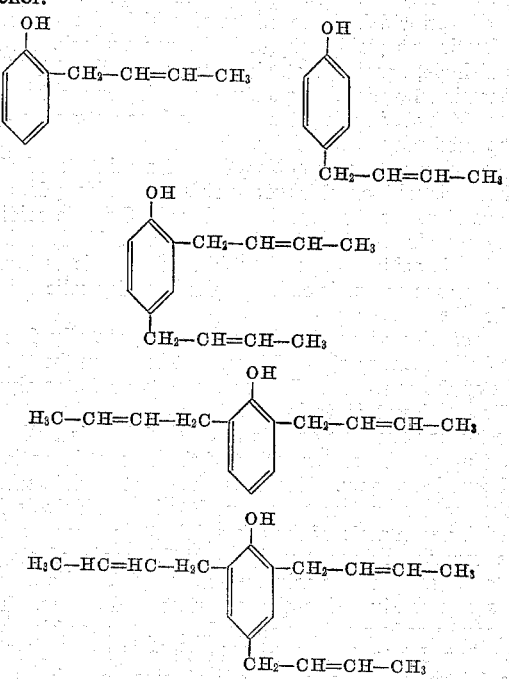

A mixture of the above alkenylphenols forms useful varnish and molding resins when condensed with an aldehyde in the presence of an acidic catalyst.

In general the alkenylphenolic compounds in the mixtures condensed with aldehydes possess the structure

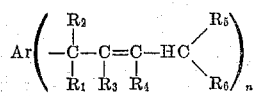

wherein Ar is an aromatic radical, $R_1$, $R_2$, $R_3$, $R_4$, $R_5$ and $R_6$ are hydrogen, halogen or an organic radical, such as a hydrocarbon radical, which may be the same or different, and $n$ is a number, ordinarily from 1 to 3. The alkenyl compounds of the above structure are all readily obtained by the reaction of phenolic compounds with conjugated dienes in accordance with the methods described in the copending applications.

Phenolic compounds which may be reacted with conjugated dienes to give compounds of the above structure include phenols, catechol, resorcinol, pyrogallol, tertiary butylcatechol, 3-isopropylcatechol, beta-naphthol, guaiacol, o-, m-, and p-cresols, 2,4-xylenol, 3,5-xylenol, m-alkylphenols, bis(4-hydroxyphenyl) 2,2-propane and the like.

Typical conjugated dienes which react with phenolic compounds to form the desired mixture of alkenylphenols include butadiene-1,3, 2-methylbutadiene-1,3, piperylene, 2-methylpentadiene-1,3, hexadiene-1,3, 1-chloro-2-methyl-butadiene-1,3, cyclopentadiene, homologues of cyclopentadiene, and the like.

The preferred alkenylphenolic compounds for condensation with aldehydes in accordance with present invention are mixtures of the butenylphenols, including ortho- and para-2-butenylphenol, di-2-butenylphenol and tri-2-butenylphenol. However, mixtures of other alkenylphenolic compounds may also be used, including butenylcresols, butenylcatechols, butenyl-2,3-dimethoxyphenols, mono-, di- and tributenylresorcinol, mono-, di- and tributenylguaiacol, 2-chlorobutenylcresol, 2-chlorobutenylphenol, 2-iodobutenylphenol, ortho- and para-cyclopentenylphenol, pentenylphenol, pentenylcresol, pentenylguaiacol, halopentenylphenols, halopentenylguaiacols, and the like.

Any aldehyde may be utilized in the preparation of the resins of the present invention. However, aldehydes containing only atoms of carbon, hydrogen and oxygen, and particularly formaldehyde, are greatly preferred. In place of formaldehyde, a material which decomposes upon heating to yield formaldehyde, for example paraformaldehyde, or trioxymethylene, may be utilized in the condensation reaction. Aqueous formalin, or a solution of formaldehyde in a lower alcohol such as butanol, may also be used very successfully.

In carrying out the condensation of a mixture of alkenylphenols with an aldehyde such as formaldehyde, an acidic condensation catalyst is employed. Suitable acidic materials include mineral acids such as sulfuric acid, hydrochloric acid, phosphoric acid, and organic carboxylic acids such as acetic acid, propionic acid, oxalic acid, and the like.

The quantity of catalyst employed is generally from about 0.5 percent to about 5.0 percent based on the total weight of the reactants. Larger amounts of the catalyst may be employed if desired.

The molar ratio of aldehyde to alkenylphenols utilized in carrying out the condensation of the present invention may be varied widely. However, the most useful resins are obtained when less than a mole of the aldehyde is utilized for each mole of the alkenylphenolic components in the reaction mixture, with about 0.8 mole of aldehyde to 1.0 mole of the mixture of alkenylphenolic compounds apparently being the optimum. However, the ratio may be as low or lower than 0.5 to 1.0 or as high or higher than 5.0 to 1.0. When the ratio is substantially above 1.5 to 1.0 no advantage is obtained and in fact, gels, rather than hard resins, may be formed. Consequently, the use of such an uneconomical excess is not particularly desirable.

The actual condensation reaction is readily carried out by first admixing the formaldehyde, or formaldehyde producing substance, with the mixture of alkenylphenols and the acidic catalyst. The resulting mixture is then heated to a temperature of about 50° C. to 150° C. for about 2 to 3 hours, after which the water present in the reaction mixture is stripped off by distillation at reduced pressure, leaving the desired resin as a hard, grindable material.

While the above described method for carrying out the condensation is preferred, particularly when the alkenylphenol mixture is a mixture of butenylphenols, other methods of conducting the condensation, for example, simply by admixing the reactants and acidic catalyst and allowing the mixture to stand at room temperature for about 48 hours, or by maintaining the reaction mixture at temperatures even higher than 150° C., may also be utilized.

As set forth hereinabove, the condensation products produced according to this invention are generally hard, resinous materials. However, they may be readily ground to any desired degree of fineness and may be dissolved in solvents such as ketones and in hydrocarbons having a high degree of solvent activity. Excellent varnishes may be produced from the resins simply by cooking the resins with drying oils and thinning to a suitable viscosity. Coatings produced from such varnishes are flexible, generally light in color and possess excellent resistance to impact, hot water, and alkalis.

It is to be understood that while the resins are generally recovered as hard, brittle materials, the condensation reaction whereby they are obtained proceeds through a stage during which the resin may be recovered as a liquid material. These liquid resins are also useful in the preparation of varnishes.

The resins of the present invention may also be used as molding compositions for the production of articles under pressure. In the preparation of a molding composition, plasticizers, lubricants, fillers, pigments and coloring matter may be incorporated if desired. The molding temperature should be such that the shaping and molding take place at a reasonable rate, but should not be so high as to cause excessive discoloration of the desired product.

The following examples illustrate more fully the preparation of alkenylphenol mixtures by the reaction of conjugated dienes with phenols, and also the preparation of resins by the acidic condensation of a mixture of alkenylphenols with an aldehyde. The examples are not, however, intended to limit the scope of the invention, for there are, of course, numerous possible variations and modifications. In the examples all parts are by weight.

Example I

Fifty-four grams (1.0 mole) of butadiene-1,3 in 100 cc. of toluene were added to a mixture of 94 grams (1.0 mole) of phenol, 100 cc. of toluene, 23 grams of polyphosphoric acid, and 10 grams of 85 percent syrupy phosphoric acid, whereupon an exothermic reaction took place. The reaction mixture was then stirred and maintained at room temperature for about 14 hours, after which the product was washed and the mixture fractionally distilled. Sixty grams of mixed monobutenylphenols, and minor quantities of di- and tributenylphenols were obtained.

Example II

Twenty-eight grams of titanium tetrachloride were added to a mixture of 94 grams (1.0 mole) of phenol, 65 grams (1.2 moles) of butadiene-1,3 and 200 cc. of toluene cooled to a temperature of −10° C. An exothermic reaction resulted and the reaction mixture was cooled and maintained at room temperature for 16 hours. The reaction mixture was then washed to remove the catalyst and distilled at reduced pressures. A yield of monobutenylphenols of about 85 percent, together with minor quantities of di- and tributenylphenols, was obtained.

*Example III*

Seventeen pounds of toluene, 17 pounds of phenol and 28.8 pounds of 67.2 percent sulfuric acid were charged into a glass-lined reactor and the reactor was then sealed. Ten and three tenths pounds of butadiene-1,3 were then added to the reactor over a period of about 15 minutes, the temperature of the reaction mixture being maintained at about 55° F. The reaction mixture was then agitated for about 18 hours after which agitation was stopped to allow the acid layer to settle out. The acid was then drawn off and the remainder of the reaction mixture treated with sodium carbonate to neutralize any remaining traces of acid. The reaction mixture was then distilled to remove the toluene. A 59 percent yield of monobutenylphenols was obtained. The remainder of the reaction mixture contained dibutenylphenols (8.0 percent), higher boiling phenols (29.0 percent) and unreacted phenol and ethers (4.0 percent).

*Example IV*

One hundred forty-eight parts of a mixture of monobutenylphenols (ortho- and parabutenylphenols), dibutenylphenol and tributenylphenol, 65 parts of formalin (37 percent formaldehyde), and 5 parts of concentrated hydrochloric acid were admixed and stirred for 16 hours at steam temperature (92–96° C.). The phenolic layer was then washed with hot water five times and dehydrated at steam temperature under 20–50 mm. pressure. The product was a hard, resinous material which could be cooked into drying oils to give fast drying, light colored varnishes.

*Example V*

Fourteen hundred eighty grams of a mixture of monobutenylphenols were placed in a reaction vessel fitted with a stirrer. To the mixture of butenylphenols 678 grams of formalin and 50 grams of concentrated hydrochloric acid were added and stirring was continued for 16 hours, the temperature being maintained at about 25° C. Two hundred cubic centimeters of butanol were then added and the reaction vessel fitted with an azeotropic separator. The water was distilled off after which inert gas was passed into the reaction mixture beneath the liquid level and the mixture blown until all the butanol was removed. A light colored, hard resinous material was obtained in a yield of 106 percent based on the weight of the phenols utilized.

*Example VI*

One hundred sixty-two grams (1 mole) of a mixture of pentenylphenols were placed in a glass-lined reactor fitted with a condenser. Sixty-four and eight tenths grams of formalin solution (0.8 mole formaldehyde) were then added to the pentenylphenols at a temperature of 24° C. Five cc. of concentrated hydrochloric acid were added slowly through the condenser, the temperature rising to 28° C. during the addition of the acid. The reaction mixture was then heated at 95° C. for 2 hours, during which time the reaction mixture was continuously agitated. The reaction mixture was then distilled at reduced pressures until all of the water was removed, the percent solids at that point being 76 percent. A 100 gram sample of the resin was heated and blown with an inert gas at 175° C. The resulting resin was hard and brittle. A second sample was baked at 175° C. for 1½ hours. After cooling the sample was very hard.

The total weight of resin obtained from the condensation reaction was 152.0 grams.

*Example VII*

Example VI was repeated except that 1 mole of a mixture of cyclopentenylphenols was substituted for the mixture of pentenylphenols utilized in Example VI. One hundred fifty-nine and two-tenths grams of a gum-like resin having 95.6 percent solids were obtained. On baking at 175° C. for 1½ hours a very hard, grindable resin was obtained.

*Example VIII*

The resin prepared in Example V was used in the preparation of a varnish as follows: The resin and linseed oil, in a ratio of 2 parts of resin to 1 part of linseed oil were charged into a reactor and heated to 300° C. under an inert gas atmosphere. This temperature was maintained until a 25 to 30 inch string was obtained. The resulting reaction product was then poured into an equal weight of solvent. A varnish having a solids content of about 50 percent in naphtha was obtained. The resulting varnish formed a hard, non-marring finish when applied to a wooden surface.

*Example IX*

A portion of the resin obtained in Example V is ground to a fine powder, placed in a mold and pressure applied at a temperature of about 350° F. A hard, chemical-resistant molding is obtained.

From the foregoing description of the invention it will be seen that the alkenylphenol-aldehyde resins of the present invention constitute a new and useful class of resinous materials. It is apparent, therefore, that various embodiments of the invention, in addition to those specifically disclosed, may be provided without departing from the spirit and scope of the invention as defined in the appended claims.

We claim:

1. A light colored resinous material comprising the product of the acidic condensation of an aldehyde containing only atoms of carbon, hydrogen, and oxygen, with a mixture of butenylphenols containing about 55 percent to 85 percent by weight of ortho- and para-monobutenylphenols, and 15 percent to 45 percent by weight of di- and tributenylphenols.

2. The light colored resinous material of claim 1 wherein the aldehyde is formaldehyde.

3. The method which comprises condensing an aldehyde containing only atoms of carbon, hydrogen, and oxygen with a mixture of butenylphenols containing about 55 percent to 85 percent by weight of ortho- and para-monobutenylphenols, and about 15 percent to 45 percent by weight of di- and tributenylphenols, in the presence of an acidic catalyst, thereby to obtain a hard, resinous material characterized by its ability to form fast drying, light colored coatings.

4. The method of claim 3 wherein the aldehyde utilized is formaldehyde.

References Cited in the file of this patent

UNITED STATES PATENTS

| | | |
|---|---|---|
| 2,006,043 | Dykstra | June 25, 1935 |
| 2,175,393 | Hentrich et al. | Oct. 10, 1939 |
| 2,242,250 | Honel et al. | May 20, 1941 |
| 2,587,578 | Jones | Mar. 4, 1952 |
| 2,656,335 | Bloch | Oct. 20, 1953 |
| 2,657,185 | Young | Oct. 27, 1953 |

FOREIGN PATENTS

| | | |
|---|---|---|
| 155,968 | Austria | Apr. 25, 1939 |